(12) United States Patent
Mackintosh et al.

(10) Patent No.: US 11,755,662 B1
(45) Date of Patent: *Sep. 12, 2023

(54) CREATING ENTRIES IN AT LEAST ONE OF A PERSONAL CACHE AND A PERSONAL INDEX

(71) Applicant: Google LLC, Mountain View, CA (US)

(72) Inventors: Alasdair John Mackintosh, Mountain View, CA (US); Aayush Kumar, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 16/293,645

(22) Filed: Mar. 6, 2019

Related U.S. Application Data

(63) Continuation of application No. 14/144,776, filed on Dec. 31, 2013, now Pat. No. 10,235,459.

(60) Provisional application No. 61/858,458, filed on Jul. 25, 2013.

(51) Int. Cl.
*G06F 16/951* (2019.01)

(52) U.S. Cl.
CPC ................... *G06F 16/951* (2019.01)

(58) Field of Classification Search
CPC ............... G06G 16/951; G06F 21/6218; G06F 2212/1052; G06F 12/084; G06F 2212/60; G06F 21/60; G06F 16/951
See application file for complete search history.

(56) References Cited

U.S. PATENT DOCUMENTS

| | | | |
|---|---|---|---|
| 6,965,968 B1 | 11/2005 | Touboul | |
| 7,596,552 B2 | 9/2009 | Levy et al. | |
| 8,335,819 B2 | 12/2012 | Fu | |
| 8,713,093 B1 | 4/2014 | Upadhyay et al. | |
| 2003/0028616 A1* | 2/2003 | Aoki et al. | H04L 67/2885 709/217 |
| 2006/0224615 A1* | 10/2006 | Korn et al. | G06Q 30/02 |
| 2007/0208755 A1* | 9/2007 | Bhatkar et al. | G06F 21/6218 |
| 2011/0087690 A1* | 4/2011 | Cairns | G06F 16/137 707/769 |
| 2011/0184936 A1 | 7/2011 | Lymberopoulos et al. | |
| 2012/0221932 A1 | 8/2012 | Gleadall et al. | |
| 2012/0317370 A1 | 12/2012 | Luna | |
| 2013/0041970 A1 | 2/2013 | Pinto et al. | |
| 2013/0144725 A1* | 6/2013 | Li et al. | H04N 21/25891 705/14.66 |
| 2013/0326354 A1* | 12/2013 | Anderson | G06Q 30/0241 715/764 |
| 2014/0005814 A1* | 1/2014 | Hwang et al. | H04N 5/783 700/94 |

* cited by examiner

*Primary Examiner* — Albert M Phillips, III
*Assistant Examiner* — Fatima P Mina
(74) *Attorney, Agent, or Firm* — Gray Ice Higdon (57) ABSTRACT

Methods and apparatus related to creating entries in a personal cache of a user and/or a personal index of a user. Entries may be created in a personal cache and/or a personal index of a user based on web-based documents visited by the user and one or more of the entries may include content specific to the user's experience with a web-based document. The personal cache and/or personal index may enable a user to view all or aspects of previously visited web-based documents and/or search previously visited web-based documents. An entry of a user's personal cache and/or personal index may optionally include information that may not be found in a public cache and/or public index.

18 Claims, 3 Drawing Sheets

FIG. 1

```
┌─────────────────────────────────────────────────────────────────────────┐
│ Receive, via at least one application executing on a computing device   │
│ of a user, a document identifier of a web-based document accessed by    │ 200
│ the user                                                                │
└─────────────────────────────────────────────────────────────────────────┘
                                     ⇩
┌─────────────────────────────────────────────────────────────────────────┐
│ Receive, via the application executing on the computing device,         │ 210
│ content of the web-based document                                       │
└─────────────────────────────────────────────────────────────────────────┘
                                     ⇩
┌─────────────────────────────────────────────────────────────────────────┐
│ Identify a user identification associated with the user                 │ 220
└─────────────────────────────────────────────────────────────────────────┘
                                     ⇩
┌─────────────────────────────────────────────────────────────────────────┐
│ Associate the document identifier with at least some of the content     │ 230
└─────────────────────────────────────────────────────────────────────────┘
                                     ⇩
┌─────────────────────────────────────────────────────────────────────────┐
│ Store the document identifier, the at least some of the content,        │ 240
│ and the association in an entry of a personal cache of the user         │
└─────────────────────────────────────────────────────────────────────────┘
                                     ⇩
┌─────────────────────────────────────────────────────────────────────────┐
│ Restrict access to the entry of the personal cache of the user          │ 250
└─────────────────────────────────────────────────────────────────────────┘
```

FIG. 2

```
┌─────────────────────────────────────────────────────────────────────────┐
│ Receive a document identifier of a web-based document accessed          │ 300
│ by a user and content of the web-based document                         │
└─────────────────────────────────────────────────────────────────────────┘
                                     ⇩
┌─────────────────────────────────────────────────────────────────────────┐
│ Generate an index entry for the document identifier and the content     │ 310
└─────────────────────────────────────────────────────────────────────────┘
                                     ⇩
┌─────────────────────────────────────────────────────────────────────────┐
│ Restrict access to the index entry                                      │ 320
└─────────────────────────────────────────────────────────────────────────┘
```

CREATING ENTRIES IN AT LEAST ONE OF A PERSONAL CACHE AND A PERSONAL INDEX

BACKGROUND

Publicly available web-based documents are sometimes stored in a public cache and/or indexed in a public index. For example, the World Wide Web may be crawled to access publicly available web-based documents and one or more of such web-based documents may be cached and/or indexed.

SUMMARY

The present disclosure is directed to methods and apparatus for creating entries in a personal cache of a user and/or a personal index of a user, and more specifically, to creating entries in a personal cache and/or a personal index of a user based on documents visited by the user. In some implementations one or more of the entries include content specific to the user's experience with a document. The personal cache and/or personal index may enable a user to view all or aspects of previously visited documents and/or search previously visited documents. An entry of a user's personal cache and/or personal index may include information concerning a document that is specific to the user's experience with the web-based document and may optionally include information that may not be found in a public cache and/or public index. For example, on a frequently changing webpage and/or a webpage that serves dynamic content, all or aspects of the content of the webpage, as it was viewed by the user, may be stored in a personal cache of the user. Such stored content may not necessarily conform to the content of the webpage as it is stored in a public cache and/or public index. Also, for example, on an access restricted webpage visited by the user, the content viewed by the user may not be publicly accessible for public caching and/or public indexing. Also, for example, certain user created content that is submitted via a web-based document may not be publicly accessible for public caching and/or public indexing.

In some implementations a computer implemented method may be provided that includes the steps of: receiving a document identifier of a web-based document accessed by a user, the document identifier being provided via one or more applications executing on a computing device of the user; receiving content of the web-based document accessed by the user, the content being provided via the one or more applications executing on the computing device of the user; identifying a user identification associated with the user; associating the document identifier with at least some of the content; storing the document identifier, the at least some of the content, and the association between the document identifier and the at least some of the content in an entry of a personal cache of the user; and restricting access to the entry of the personal cache of the user based on the user identification associated with the user.

This method and other implementations of technology disclosed herein may each optionally include one or more of the following features.

The method may include: receiving navigation information, the navigation information indicative of one or more user actions via the computing device in navigating to the web-based document; associating the navigation information with the document identifier, and the at least some of the content; and storing the navigation information and the association between the navigation information and the document identifier and the at least some of the content in the personal cache of the user. The navigation information may based on a referrer URL that linked to the web-based document. In some of those implementations the navigation information may be based on one or more search terms indicated by the referrer URL.

The method may include: receiving an indication of the content prior to receiving the content; determining, based on the indication of the content, whether the content should be provided by the one or more applications; and providing approval instructions to the one or more applications when it is determined the content should be provided by the application; wherein the content is only provided by the one or more applications in response to the providing of the approval instructions to the one or more applications. The indication of the content may include the document identifier and determining whether the content should be provided by the one or more applications may be based on whether the document identifier identifies a publicly accessible document. The indication of the content may include the document identifier and the determining whether the content should be provided by the one or more applications may be based on an update frequency associated with the document identifier. The indication of the content may include a subset of the content and the determining whether the content should be provided by the one or more applications may be based on determining similarity between the subset of the content and previously stored content associated with the document identifier.

The associating the document identifier with at least some of the content may include indexing the document identifier based on one or more aspects of the content. The method may include ranking the one or more aspects of the content indexed with the document identifier.

The at least some of the content may be a subset of the content and the method may further include determining the at least some of the content based on similarity between the content and previously stored content associated with the document identifier.

The web-based document may be a web-based document tailored to the user.

At least some of the content may comprise content that is not accessible via public crawling of the web-based document.

The stored at least some of the content may enable reproduction of the web-based document.

Restricting access to the entry of the personal cache of the user based on the user identification associated with the user may include preventing viewing of the entry by non-authorized users and preventing searching of the entry by non-authorized users.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein populate a personal cache of a user based on documents visited by the user and prevent access to the personal cache of the user by non-authorized users. Particular implementations of the subject matter described herein create entries in a personal index of a user based on documents visited by the user and prevent access to the personal index of the user by non-authorized users. Particular implementations of the subject matter described herein may receive navigation information associated with document visited by a user and associate the navigation information with a document identifier of the document and at least some of the content of the document, such as content specific to the user's experience with the document. One or more aspects of the navigation information, and the association between the navigation information and the document identifier and the at least some of the content may be stored in the personal cache of the user and/or the personal index of the user.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Aspects of the technology disclosed herein are directed to methods and apparatus for populating a personal cache of a user. Some implementations are directed to populating a personal cache of a user based on documents visited by the user. The personal cache may enable a user to view, at a later time, one or more aspects of a document previously viewed by the user at a given time, as those one or more aspects were presented to the user at the given time. The personal cache may additionally and/or alternatively enable a user to search, at a later time, one or more aspects of the document, as those one or more aspects were presented to the user at the given time. In some implementations the personal cache may be searched directly. As described herein, in some implementations entries may be created in a personal index to enable more efficient searching of the personal cache. As described herein, a personal cache and/or personal index of a user may include information concerning documents that are specific to the user's experience with those documents and may include information that may not be found in a public cache and/or public index.

As one example, a web browser and/or other application executing on a computing device may, for each webpage visited, provide a document identifier such as a uniform resource identifier ("URI") and at least some of the content of the webpage. One or more servers managing a personal cache of the user may: receive the document identifier; receive the content; associate the document identifier with at least some of the received content; and store the document identifier, the at least some of the received content, and the association between the document identifier and the at least some of the received content in the personal cache.

As described herein, in some implementations the computing device may also provide navigation information that is indicative of one or more user actions in navigating to the webpage. For example, the navigation information may include information related to one or more search queries issued by the user in navigating to the webpage and/or one or more prior web-based documents visited in navigating to the webpage. The navigation information may also be associated with the document identifier and the content and stored in the personal cache. The navigation information may provide additional information concerning the relevance of the webpage to the user to enable, inter alia, searching of the personal cache based on the navigation information and/or determination of when to provide the cached version of the webpage to the user based on the navigation information.

In some implementations, the one or more servers managing the personal cache may receive an indication of the content prior to receiving the content and determine whether the computing device should provide the content based on the indication of the content. In some of those implementations the content may only be provided by the computing device when approval instructions are given to the computing device by the one or more servers. Determining whether to instruct the computing device to provide the content via approval instructions may be based on, for example, whether the webpage is public or private (e.g., more likely if private), an update frequency of the webpage (e.g., more likely if updated frequently), and/or similarity of the indication of the content to previously cached content of the webpage (e.g., more likely if the indication of the content represents new previously un-cached content).

Also, as described, in some implementations the document identifier, one or more aspects of the content, and/or one or more aspects of the navigation information may be indexed and/or ranked in a personal index of the user to enable more efficient searching of the personal cache of the user.

Figure 1:
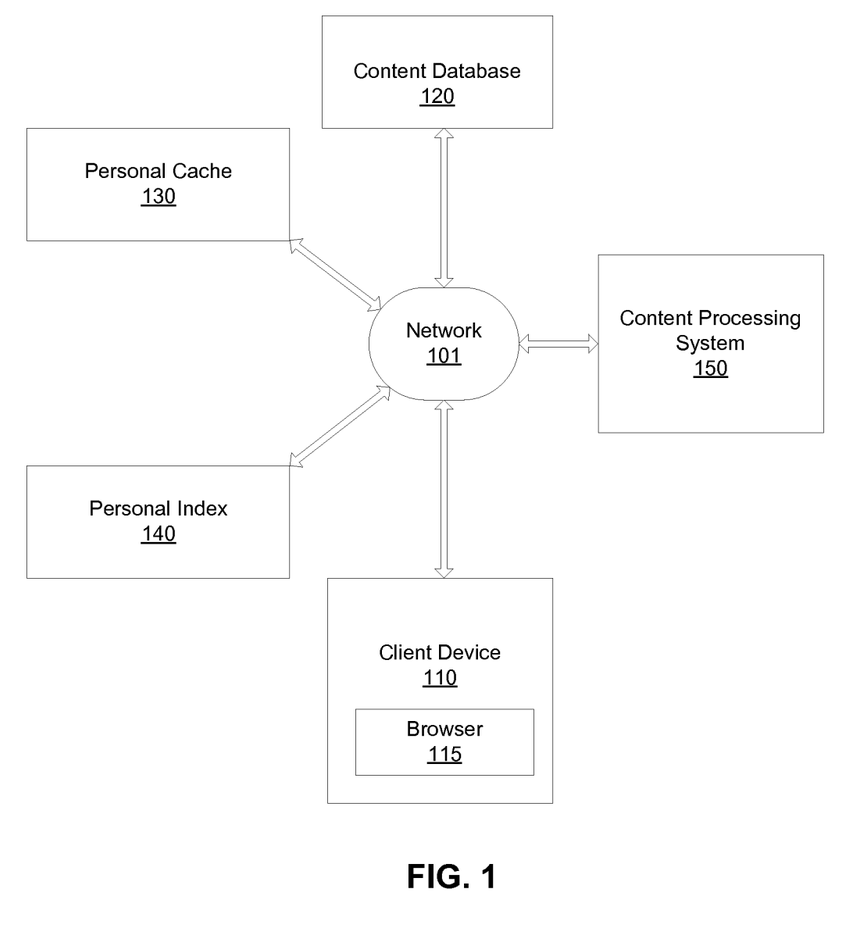
FIG. 1 is a block diagram of an example environment in which entries in a personal cache of a user and/or a personal index of a user may be created.

FIG. 1 illustrates a block diagram of an example environment in which a personal cache of a user may be populated. The example environment of FIG. 1 may include a computing device 110, a content database 120, a personal cache 130, a personal index 140, and a content processing system 150. The environment may also include a communication network 101 that enables communication between various components of the environment. In some implementations the communication network 101 may include the Internet, one or more intranets, and/or one or more bus subsystems. The communication network 101 may optionally utilize one or more standard communications technologies, protocols, and/or inter-process communication techniques.

In some implementations a user may interact with the content processing system 150 through at least one computing device 110. The computing device 110 may be, for example, a desktop computer, a laptop, a tablet computer, a mobile phone, a tablet computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device). Additional and/or alternative computing devices of the user may be provided. The computing device 110 and the content processing system 150 may each include memory for storage of data and software applications, a processor for accessing data and executing applications, and components that facilitate communication over the communication network 101. The operations performed by the computing device 110 and/or the content processing system 150 may be distributed across multiple computer systems.

The computing device 110 may execute one or more applications, such as web browser 115, that may provide a document identifier and content of a web-based document accessed via the computing device 110 to the content processing system 150. A web-based document is an electronic document available over a computer network such as network 101 and/or the Internet. A web-based document may include posts on social media platforms, HTML pages, XML pages, word processing documents, portable document format ("PDF") documents, images, video, feed sources, and so forth. For example, a web-based document may be a webpage accessed via the browser 115 of the computing device. Also, for example, a web-based document may be a video accessed via an application of the computing device 110 that enables viewing of videos such as the browser 115 and/or another application. As yet another example, a web-based document may be a collection of content from one or more sources provided to an application executing on the computing device 110 that causes one or more aspects of the content to be provided (e.g., visibly, audibly) to the user via the computing device 110. One or more web-based documents may optionally have features including one or more of online portability, compatibility with a variety of web-based applications, indexing features, encryption and/or decryption features, and compressible and/or decompressible features.

In some implementations one or more web-based documents may be tailored to the user. For example, a web-based document providing weather information may be tailored to the user based on the user's determined and/or indicated location. As another example, a web-based document providing news articles may be tailored to the user's interests. For example, the user may choose to receive news related to: one or more particular categories such as sports, politics, finance, etc.; news related to one or more particular countries; and/or news in a particular language of choice. For example, a first user accessing the webpage "news.exampleurl.com" may be provided with a first collection of news headlines, while a second user accessing the webpage "news.exampleurl.com" may be provide with a second collection of news headlines that is unique from the first collection. As another example, a web-based document providing a shopping platform may be tailored to the user's personal shopping preferences and/or purchase history. Also, for example, a web-based document providing stock quotes may be tailored to the user's settings and/or previous interactions with the web-based document. Also, for example, a web-based document providing social networking updates to a user via a social networking application executing on the computing device 110 may be tailored to the user's social networking connections and/or preferences. Also, for example, a web-based document providing news updates to a user via a news viewing application executing on the computing device 110 may be tailored to the user's indicated and/or inferred preferences.

The document identifier of a web-based document that is provided to the content processing system 150 by the computing device 110 enables identification of the web-based document accessed via the computing device 110. In some implementations the document identifier may be a URI such as a uniform resource locator ("URL") that links to the web-based document and/or a uniform resource name ("URN") that identifies the web-based document without specifying the means for obtaining the web-based document. For example, "www.uspto.gov/" is the URL for the Home Page of the United States Patent and Trademark Office. In some implementations the URL may be directed to a webpage. In some implementations the URL may be directed to another document such as, for example, a PDF document, a DOC document, an image document, and/or a video document. In some implementations the document identifier may include and/or be associated with timestamp information indicating a date and/or time that the referenced web-based document was viewed by a user. For example, a visit by a user to "www.uspto.gov" on Mar. 20, 2013 may be referenced by a document identifier of "www.uspto.gov/?visit_date=Mar. 20, 2013" or a document identifier of "[www.uspto.gov, Mar. 20, 2013]". The date and/or time that the referenced web-based document was viewed by a user may be based on, for example, an indication provided by the computing device 110 and/or a time of receipt of the document identifier and/or content of the web-based document by the content processing system 150. For example, the content processing system 150 may associate a timestamp with a received document identifier based on time of receipt of the document identifier. Additional and/or alternative document identifiers may be utilized.

The content of a web-based document that is provided to the content processing system 150 by the computing device 110 includes one or more aspects of content of the web-based document as it is received by the computing device 110. Content may include the text, images, sound, video, hyperlinks, embedded graphics, meta information, embedded instructions (such as JavaScript scripts), code (e.g., for applications), and/or other content of a web-based document. In some implementations the content may include metadata associated with the web-based document. The metadata may include metadata associated with the web-based document as a whole such as, for example, the author of the web-based document, the date and/or time the web-based document was first created, the date and/or time the web-based document was last edited, information related to the format of the web-based document, document permissions, security related information, and so forth. The metadata may additionally and/or alternatively include metadata associated with one or more aspects of the web-based document such as media included in the web-based document. For example, a web-page may include an embedded image and/or video and metadata associated with such image and/or video may be provided as content.

In some implementations the content of a web-based document that is provided to the content processing system 150 may include all content necessary to recreate the web-based document. For example, for a webpage, the content may include the entirety of the source code of the webpage such as HTML and/or XML source code and any images, video, and/or other media rendered on the webpage. In some implementations the content of a web-based document that is provided to the content processing system 150 may include content necessary to recreate only a portion of the web-based document. For example, the content provided for a webpage that includes advertisements on the webpage may exclude the advertisements. Also, for example, the content provided for a web-based document that includes content that is determined to be static may exclude the static content. Also, for example, the content provided for a web-based document that includes content that is determined to be beyond a threshold size, such as a large video, may exclude such content.

In some implementations content of a web-based document that is selected for providing to the content processing system 150 may optionally be based on a user's interaction with the web-based document and/or content of a web-based document may optionally include information related to a user's interaction with the web-based document. For example, content of a web-based document visited by a user may include multiple hyperlinks of the web-based document and an indication of one or more of the hyperlinks in the web-based document that were selected by the user. For example, the user may visit a webpage containing multiple hyperlinks and select a hyperlink from that webpage that links to a sports-related news article. In some implementations content provided for that webpage may include the multiple hyperlinks and an indication that the hyperlink to the sports-related news article was actually selected by the user. In some other implementations, only the hyperlink to the sports-related news article is provided as part of the content and the other hyperlinks are not provided as part of the content since they were not selected by the user.

As another example, a web-based document may include multiple videos that may be viewed by a user, and the user may only select one of the videos to view in whole or in part. In some implementations content provided for that web-based document may include content related to the multiple videos, such as the videos and/or URIs for the videos, and an indication that the viewed video was actually selected for viewing by the user. In some other implementations, content provided for that web-based document may include only content related to the viewed video and/or more robust content for the viewed video, and content related to the other videos may not be provided and/or less robust content for the other videos may be provided. For example, the entirety of the viewed video may be provided as content to enable replaying of the viewed video from the personal cache 130 of the user, while only URIs and/or metadata of the non-viewed videos is provided as content to enable identification of such videos, but not enabling viewing of the non-viewed videos from the personal cache 130 of the user alone. As another example, a web-based document may include instructions to display a snippet of content that may be expanded to display additional content in response to a selection by the user related to the snippet of content. In some implementations content provided for that web-based document may include content related to the snippet of content and/or the additional content, and an indication that the user selected the snippet of content for expansion.

As another example, a web-based document may include one or more user entry fields to enable user entry of text input, voice input, document input, and/or other input of the user. Such input of the user may be utilized to modify the contents of the web-based document and/or may be utilized to store data related to the input in one or more content databases such as content database 120. Moreover, such input of the user may be utilized as content of the web-based document that is selected for providing to content processing system 150. For example, an entry field of a webpage of a service provider may enable the user to submit comments for consideration by the service provider. Content provided for that webpage may include content related to a comment submitted by the user, such as the text of the comment submitted by the user. Also, for example, an entry field of a webpage of an online posting website may enable submission of text related to an item a user wishes to sell and enable submission of images of the item. Content provided for that webpage may include submitted text related to the item the user wishes to sell and a copy of the submitted image of the item. Additional user entry fields of a web-based document may include entry fields in one or more of user emails, calendar entries, social media interactions, blog posts, financial information, purchases, and so forth.

As one example of providing a document identifier and content to the content processing system 150, a user may access a webpage of an online shopping retailer that renders the user's shopping cart for the online shopping retailer. The web browser 115 may provide content of the webpage to the content processing system 150 such as, for example, information related to the contents of the virtual shopping cart such as descriptions of products of the shopping cart, images of products of the shopping cart, and/or price information of products of the shopping cart. In some implementations the web browser 115 may provide the source code of the webpage and any media of the webpage to the content processing system 150. As described herein, a document identifier for the webpage such as "https://www.exampleurl.com/shopping_cart=customer_id=4326" may also be provided by the web browser 115. The content processing system 150 may store the content, the document identifier and/or an association between the content and the document identifier in the personal cache 130 of the user.

As another example, the user may search for a vacation package to Hawaii and select a search result that leads to a webpage with travel information related to vacation packages to Hawaii. As referred to herein, a "selection" of a virtual object, a search result, and/or an online resource may include, for example a mouse-click, a click-through, a voice-based selection, a selection by a user's finger on a presence-sensitive input mechanism (e.g., a touch-screen device), and/or any other appropriate selection mechanism. The web browser 115 may forward the contents of the webpage, such as, for example, the content necessary to fully reproduce the webpage, to the content processing system 150. As described herein, a document identifier for the webpage such as "https://www.exampleurl.com/hawaii-vacations.com/package_id=2346" may also be provided by the web browser 115. The content processing system 150 may store the content, the document identifier and/or an association between the content and the document identifier in the personal cache 130 of the user.

In some implementations the web browser 115 and/or other application of the computing device 110 may provide an indication of content of a web-based document to the content processing system 150 prior to providing the content. The indication of the content may enable the content processing system 150 to determine if it is desirable to receive additional content from the computing device 110. If, based on the indication of the content, the content processing system 150 determines it is desirable to receive additional content from the computing device 110, the content processing system 150 may provide approval instructions to the computing device 110 to cause the computing device 110 to provide the additional content. Providing an indication of content prior to providing additional content may prevent some unnecessary network traffic between computing device 110 and content processing system 150.

In some implementations the indication of the content may be the document identifier. For example, the computing device 110 may provide the document identifier to the content processing system 150 and the content processing system 150 may determine, based on the document identifier, whether it is desirable to receive additional content from the computing device 110. For example, as described herein, in some implementations the content processing system 150 may utilize the document identifier to determine, inter alia, whether the web-based document is publicly available, whether the web-based document is access-restricted (e.g., only available to one or more authorized users), whether the web-based document includes dynamic content, and/or the update frequency of the web-based document. Based on one or more of such factors and/or additional factors, the content processing system 150 may determine whether it is desirable to receive additional content of the web-based document. For example, for a web-based document that is publicly available, contains only static content, and is updated only once a year, the content processing system 150 may determine it is undesirable to receive content related to the web-based document. Also, for example, for a web-based document that is not publicly available, it may be desirable to receive content related to the web-based document. Also, for example, for a web-based document that is associated with a document identifier indicating the web-based document was viewed via an application that provides tailored content to the user, it may be desirable to receive content related to the web-based document.

In some implementations the indication of content may include a subset of the content. For example, the indication of the content may include metadata of the web-based document; a segment of the content such as the first 100 Kilobytes of the content, a randomly selected percentage of the content, etc.; and/or other selection of content that is less than the amount of content to potentially be provided. For example, a randomly selected percentage of the content may be selected and provided to the content processing system 150 as the indication of content. The content processing system 150 may, for example, compare the indication of the content to previously cached content (personal cache and/or public cache) to determine whether it is desirable to receive additional content. For example, if the provided indication of content matches content that has previously been cached in a public cache and/or personal cache, it may not be desirable to receive additional content since it may be likely that such additional content would also be cached in in the public cache and/or personal cache. On the other hand, if the provided indication of content does not match content that has previously been cached in a public cache and/or personal cache, it may be desirable to receive additional content since it may be likely that such additional content would also not be cached in the public cache and/or personal cache. Additional description related to potential indications of content and determinations by the content processing system 150 as to whether it is desirable to receive additional content from the computing device 110 based on the indications of content is provided herein.

In some implementations, the computing device 110 and/or other component may provide navigation information related to a web-based document to the content processing system 150. The navigation information is indicative of one or more user actions via the computing device 110 in navigating to the web-based document. The navigation information may be stored by the content processing system 150 and associated by the content processing system 150 with the document identifier of the web-based document and the content of the web-based document in the personal cache 130 and/or the personal index 140 to provide additional information related to the user's interaction with the web-based document. In some implementations the navigation information may be based on one or more searches issued by the user in navigating to the web-based document. For example, the user may submit a search query of "blackhawks hockey news" and select a search result that leads to the sports webpage of a Chicago news source. The navigation information may include the search query "blackhawks hockey news" and may be provided by the computing device 110 and/or other component (e.g., search engine) with the document identifier for the sports page and content of the sports webpage.

In some implementations the search query may be identified based on determining the user's search activities and/or selection of search results via the browser 115 and/or other application executing on computing device 110. In some implementations the search query may be identified based on determining the user's search activities and/or selections of search results via a system separate from the computing device 110 such as a search engine record of past searches and selections of search results from the past searches when the user is logged in to the search engine or otherwise identified by the search engine. In some implementations the search query may be identified based on a referrer URL selected by the user in navigating to the webpage. For example, the referrer URL in navigating to a sports page of a Chicago news source with a URL of "www.examplecurl.com/examplechicagosportspage" after selecting a search result for a search query of "blackhawks hockey news" issued via "www.examplesaerchengine.com" may be "http://www.examplesearchengine.com/url?searchterms=blackhawks_hockey_news&url = http://www.examplecurl.com/examplechicagosportspage". The referrer URL indicates the user navigated from "www.examplesearchengine.com" after issuing a search for "blackhawks hockey news" (as indicated by "searchterms="). Additional and/or alternative formats of referral URLs that provide an indication of search terms may be utilized.

In some implementations the navigation information may be based on one or more prior web-based documents visited by the user prior to navigating to the web-based document. For example, the user may visit a webpage focused on the team "The Chicago Blackhawks" and may select a hyperlink on the webpage that links to the sports page of a Chicago news source, or navigate independently to the sports page of a Chicago news source. The navigation information may include the information related to the prior web-based document visited by the user such as, for example, the URL of the prior web-based document, a title of the prior web-based document, one or more prominent terms of the prior web-based document, and/or one or more entities associated with the prior web-based document. In some implementations entities associated with the prior web-based document may be determined based on a document to entity mapping that maps the document with one or more entities to which the document pertains. In some implementations entities associated with the prior web-based document may be determined based on frequent and/or prominent mention of one or more alias and/or other properties of the entities in the web-based document. Navigation information related to the prior web-based document may be provided by the computing device 110 and/or other component with the document identifier for the sports page and content from the sports page.

In some implementations the navigation information related to the prior web-based document may be identified based on determining the user's navigation activities via the browser 115 and/or other application executing on computing device 110. In some implementations navigation information related to the prior web-based document may be identified based on determining the user's navigation activities via a system separate from the computing device 110 such as a browsing history record of the user from a remote browsing history database when the user is logged in to a browser and has approved remote browsing history collection. In some implementations the navigation information related to the prior web-based document may be identified based on a referrer URL selected by the user in navigating to the webpage. For example, the referrer URL in navigating to a sports page of a Chicago news source with a URL of "www.exampleurl.com/examplechicagosportspage" after selecting a hyperlink on a webpage focused on the team the Chicago Blackhawks located at "www.exampleurl2.com/blackhawks" may be "http://www. www.exampleurl2.com/blackhawks/&url= http://www.exampleurl.com/examplechicagosportspage". The referrer URL indicates the user navigated from "www.exampleurl2.com/blackhawks" in reaching the webpage "www.exampleurl.com/examplechicagosportspage". Additional and/or alternative formats of referral URLs that provide an indication of referring webpages and/or websites may be utilized.

In some implementations navigation information related to multiple search queries issued by the user and/or multiple prior web-based documents visited by the user prior to navigating to the web-based document for which navigation information is being provided may be utilized. For example, the user may issue a search query, then navigate to a first webpage by selecting a first search result for the search query, then navigate to a second webpage by selecting a hyperlink on the first webpage, then navigate to a third webpage by selecting a hyperlink on the second webpage. The navigation information may include the search query, and information related to the first webpage and the second webpage.

In some implementations certain navigation information may be weighted more heavily by the computing device 110 and/or the content processing system 150 than other navigation information. For example, in the immediately preceding example, the information related to the second webpage may be weighted more heavily than the information related to the first webpage and/or the search query since it was more recent in time in navigating to the third webpage. Also, for example, one or more user actions related to one or more of the first webpage and/or the second webpage may influence the weighting of navigation history based on such webpages. For example, the user may spend more time browsing the contents of the first webpage than the second webpage, may have sent an email to an email address of the first webpage, and placed a telephone call to a number listed on the first webpage. Based on such extensive interactions with the first webpage, the first webpage may optionally be weighted more heavily than the second webpage. As described herein, in some implementations the content processing system 150 may store the navigation information and the association between the navigation information and the document identifier and the at least some of the content in the personal cache 130 and/or in an entry in the personal index 140.

In some implementations, the browser 115 and/or other application of the computing device 110 may include standard functionality and/or an extension via which one or more techniques described herein with respect to computing device 110 may be implemented. For example, the browser 115 may provide the document identifier of a web-based document to content processing system 150, provide an indication of content of a web-based document to content processing system 150, provide content of the web-based document to content processing system 150, and/or provide navigation information to the content processing system 150. Generally speaking, browser extensions are computer programs that extend the functionality of the browser and/or the functionality of web-based documents accessed via the browser. In some implementations, a browser extension may interact with web pages and/or servers by utilizing content scripts or cross-origin XMLHttpRequests.

In some implementations, an application of the computing device 110 may include functionality that enables techniques described herein to be implemented in response to web-based documents being viewed in one or more separate applications executable on the computing device 110. For example, the application may, for each of a plurality of separate applications executable on the computing device 110, provide the document identifier of a web-based document accessed via the separate application to content processing system 150, provide an indication of content of the web-based document to content processing system 150, provide content of the web-based document to content processing system 150, and/or provide navigation information to the content processing system 150. In some implementations the application may be included as a standard application for an operating system of the computing device 110.

In some implementations a user identification associated with a user of the computing device 110 is provided via the computing device 110. In some implementations the user identification may be provided with and/or included with a document identifier and/or content provided by the computing device 110. For example, the user identification may be stored in a cookie that is submitted with and/or included with a document identifier and/or content provided by the computing device 110. Also, for example, the user identification may be a user identification that is associated with a service that manages the content processing system 150 and/or that has partnered with a service managing the content processing system 150 and may be submitted with and/or included with a document identifier and/or content provided by the computing device 110. For example, a user may, via computing device 110, utilize user credentials to log in to a first service that manages the content processing system 150 and may log in to a second service that enables the user to view one or more web-based documents that are specific to the second service. User identification data that is associated with the first service may be provided with the document identifier and/or content that is associated with one or more web-based documents specific to the second service.

The user identification specifies the identity of a user of the computing device 110 and may be utilized to determine access information applied to information provided by the computing device 110 when the content processing system 150 provides such information for storage in the personal cache 130 and/or the personal index 140. For example, the content processing system 150 may include access information with an entry of the personal cache 130 that specifies that the user identified by the user identification associated with the user who submitted the content of the entry is authorized to access the entry. In some implementations the access information may be included with each entry of the personal cache 130. In some implementations the access information may be included with a grouping of entries in the personal cache 130. For example, the personal cache 130 may contain only entries of the user and the personal cache 130 as a whole may include access information collectively applied to items stored in the personal cache 130. The user identification may also be utilized to determine which entries in personal cache 130 and/or personal index 140 a user is allowed to access. For example, only those entries in the personal cache 130 and/or personal index 140 that are associated with access information that is determined to match the user identification may be accessed. Additional and/or alternative techniques for restricting access to entries in the personal cache 130 and/or entries in the personal index 140 may be utilized.

As described herein, the content processing system 150 may maintain the personal cache 130 and/or the personal index 140 based at least on document identifiers and content of web-based documents provided via the computing device 110. For example, the content processing system 150 may receive, via the computing device 110, a document identifier of a web-based document and content of the web-based document and store the document identifier, at least some of the content, and an association between the document identifier and the at least some of the content in the personal cache 130. The content processing system 150 is an example of a system in which the systems, components, and techniques described herein may be implemented and/or with which the systems, components, and techniques described herein may interface.

The personal index 140 may enable searching of the personal cache 130 to determine whether an entry of the personal cache may be relevant to a search query of the user and/or other user action without necessitating searching the entirety of personal cache 130. In some implementations personal index 140 may be omitted and personal cache 130 may be searched directly. As described herein, the personal index 140 and/or the personal cache 130 may be associated with access information to allow access only to users who are authorized to access such content and prevent access to all other users. In some implementations the personal cache 130 is specific to a particular user and the personal cache 130 is private content that is accessible to the user and non-accessible to a plurality of additional users that differ from the user. For example, the personal cache 130 may be accessible only to the user and non-accessible by any other users. Also, for example, the personal cache 130 may be accessible to the user and certain additional users designated by the user.

In some implementations, the personal index 140 includes an index of private entries of a plurality of users, with each index entry and/or a group of index entries associated with access information to allow access only to users who are authorized to access such index entries and prevent access to all other users. Thus, the personal index 140 may include index entries for a plurality of users, but each index entry and/or a group of index entries may include access information to prevent access by any users not authorized to access such index entries. Similarly, the personal cache 130 may include a collection of private entries of a plurality of users, with each entry and/or a group of entries associated with information to allow access only to users who are authorized to access such entries and prevent access to all other users. Thus, the personal cache 130 may include entries of a plurality of users, but each entry and/or a group of entries may include access information to prevent access by any users not authorized to access such entries.

Using personal cache 130 and/or direct input from computing device 110, content processing system 150 generates index entries and stores the index entries in personal index 140. Generally, an index entry includes information that indexes one or more entries of personal cache 130. For example, an index entry for a given entry of personal cache 130 may include portions of the given entry that the content processing system 150 has determined are relevant for identifying and/or for searching contents of the given personal cache entry, information describing contents of the given personal cache entry, keywords for the given personal cache entry, and/or a unique identifier for the given personal cache entry. An index entry may also include information specifying the document identifier of the given personal cache entry including, for example, a URL or other document identifier. An index entry may also include information specifying the access date and/or time of the given personal cache entry that is indicative of the date and/or time the web-based document associated with the personal cache entry was accessed by the user. In some implementations the access date and/or time may be included in the document identifier. In some implementations determined information for a given index entry may be determined by parsing contents of the given personal cache entry.

As described, in some implementations, entries in the personal cache 130 and/or entries of the personal index 140 may each be associated with access information to allow access only to users who are authorized to access such content and prevent access to all other users. Any generated personal cache entry and/or index entry may include and/or be associated with an access control list with access information that generally specifies identities of one or more users that are authorized to access the generated entry. For example, content processing system 150 may determine one or more users that are authorized to access an entry of personal cache 130 and include an access control list with the entry that lists those authorized users. As described, the identity of users that are authorized to access the entry of the personal cache may be based on the user identification associated with the entry. For example, the entry of the personal cache 130 may be a document identifier and associated content of a web-based document accessed by a user and may include information that specifies that only that user is authorized to access that entry.

In some implementations, one or more encryption technologies are utilized to encrypt entries in the personal cache 130 and/or personal index 140 to promote secure storage. For example, in some implementations an entry of the personal cache 130 and/or personal index 140 may be encrypted utilizing a wrapped key, AES-based encryption, and/or other encryption technologies. Additional and/or alternative techniques for promoting secure storage of entries may be utilized such as strong encryption technologies.

In some implementations the content processing system 150 may additionally have access to and/or maintain a public cache and/or a public index in content database 120 and/or other database. For example, the content processing system 150 may crawl the World Wide Web or other public resource and cache and/or index publicly accessible documents as is commonly known in the art using, for example, conventional and/or other indexing techniques. Although a separate public cache and personal cache 130, and a separate public content index and personal index 140 are described, in some implementations a single cache and/or a single index may include both public and personal data (with appropriate access restrictions).

As described herein, one or more aspects of content provided to the content processing system 150 by computing device 110 and stored in the personal cache 130 and/or personal index 140 may be content that is in addition to content of a public cache and/or public index. For example, the content processing system 150 may receive content that may include private, optionally access-restricted, data that is inaccessible via public crawling of the World Wide Web or other public resource. Also, for example, content may include content that is accessible via public crawling of a URL, but the URL has yet to be crawled since the content was present on the URL. For example, a news website may have been updated since the last time the news website was crawled by a public crawl engine. As another example, an online auction website may have been updated since the last time the online auction website was crawled by a public crawl engine. When the user views such updated content, the updated content may be provided to content processing system 150 to store the content in the personal cache 130 and/or index the content in the personal index 140. Accordingly, such content may be in addition to other content that may have been obtained through public crawling of the URL.

Also, for example, public crawling may not enable access to certain web-based documents such as those only accessible via unlinked URLs, links that are embedded within an area tag, and/or those that are specifically excluded from crawling. Also, for example, public crawling may not enable access to certain content generated by the user. User generated content may include one or more of user emails, calendar entries, social media interactions, blog posts, tweets, financial information, purchases, and so forth.

As described herein, the content processing system 150 may receive a document identifier of a web-based document and content of the web-based document and store the document identifier, at least some of the content, and the association between the document identifier and the at least some of the content in an entry of the personal cache 130. A given web-based document may be associated with multiple entries in the personal cache, with each entry representing one or more aspects of the web-based document at a unique time. For example, a first entry of the web-based document may include content of the web-based document as it was viewed at a first time by the user and a second entry of the web-based document may include content of the web-based document as it was viewed at a second time by the user. The content in the first entry may differ from the content of the second entry. Also, for example, a first entry of the web-based document may include navigation information related to viewing of the web-based document at a first time by the user and a second entry of the web-based document may include navigation information related to viewing of the web-based document at a second time by the user. The navigation information in the first entry may differ from the navigation information of the second entry. In some implementations timestamp information may optionally be associated with each entry. The timestamp information may identify a date and/or time associated with the user's access of the web-based document identified by the entry. The timestamp information may be based on information received from the computing device 110 related to the entry and/or based on a date and/or time of receipt of information received from the computing device 110 related to the entry.

Also, as described herein, in some implementations the content processing system 150 may receive an indication of the content of a web-based document from the computing device prior to the computing device 110 providing additional content of the web-based document. The content processing system 150 may utilize the indication of the content to determine if it is desirable to receive additional content from the computing device 110. If, based on the indication of the content, the content processing system 150 determines it is desirable to receive additional content from the computing device 110, the content processing system 150 may provide approval instructions to the computing device 110 to cause the computing device 110 to provide the additional content. For example, the content processing system 150 may provide approval instructions in the form of a command to the computing device 110 to provide all or aspects of the content of the web-based document.

In some implementations the indication of the content may be the document identifier of the web-based document. For example, the computing device 110 may provide the document identifier to the content processing system 150. The content processing system 150 may determine, based on the document identifier, whether it is desirable to receive additional content from the computing device 110. For example, the content processing system 150 may utilize the document identifier to determine whether the web-based document is publicly available, whether the web-based document is access-restricted, and/or whether the web-based document includes dynamic content. Based on one or more of such factors and/or additional factors, the content processing system 150 may determine whether it is desirable to receive additional information.

For example, if the web-based document is public it may weigh against receiving additional information since a public cache and/or a public index of the web-based document may be available. Also, for example, if the web-based document is access-restricted it may weigh in favor of receiving additional information since a public cache and/or a public index of the web-based document may not be available. Determining whether a web-based document is public and/or access-restricted based on a document identifier of the web-based document may be based on, for example, the content of the document identifier itself and/or information related to the document identifier stored in one or more databases such as content database 120. For example, the content of the document identifier may indicate private content if it includes one or more terms indicative of private content such as "https". Also, for example, the document identifier may be mapped to an indication of whether the web-based document is public or private. For example, if the document identifier is mapped to an entry of a public cache and/or public index, it may be determined to be public. On the other hand, if the document identifier is not mapped to an entry of a public cache and/or public index, it may be determined to be private. Also, for example, if the document identifier indicates the document is related to an application that provides tailored content to the user, it may be determined to be private.

Also, for example, if the web-based document includes dynamic content it may weigh in favor of receiving additional information since at least the dynamic content may not be available in a public cache and/or a public index of the web-based document. Generally speaking, dynamic content, as used herein, includes content that is tailored to a user and/or a group of users and/or content that is changing with at least a threshold level of frequency. For example, a webpage providing a collection of news headlines may include dynamic content since the news headlines may be frequently updated and/or tailored to a particular user and/or group of users. For example, the news headlines may be specific to a location of the user and/or preferences selected by the user. On the other hand, a webpage listing contact information for a specific business entity may not include dynamic content since the contact information may not change often and/or may not be tailored for a specific user and/or group of users. Determining whether a web-based document contains dynamic content based on a document identifier of the web-based document may be based on, for example, the content of the document identifier itself and/or information related to the document identifier stored in one or more databases such as content database 120. For example, the content of the document identifier may be indicative of static, non-dynamic content if it ends with a file extension such as ".pdf". Also, for example, a document identifier that includes ".aspx" may be indicative of dynamic content. Also, for example, the document identifier may be mapped to an indication of whether the web-based document which it identifies is dynamic. In some implementations whether the web-based document is identified as dynamic may be based on a mapping of the document to an update frequency of the document. The update frequency may be obtained, for example, from the document itself and/or from crawling of the document. For example, repeated crawling of a web-based document may indicate the web-based document changes frequently and based on the frequent changes, the web-based document may be indicated as a dynamic web-based document.

In some implementations the indication of content may include a subset of the content. For example, the indication of content may include metadata of the web-based document; a segment of the content such as the first 100 Kilobytes of the content, a randomly selected percentage of the content, etc.; and/or other selection of content that is less than the amount of content to be provided. For example, a randomly selected percentage of the content may be selected and provided to the content processing system 150 as the indication of content. The content processing system 150 may determine, based on the subset of the content, whether it is desirable to receive additional content from the computing device 110.

For example, if the provided indication of content matches content that has previously been cached in a public cache and/or personal cache 130, it may not be desirable to receive additional content since it may be likely that such additional content would also be cached in the public cache and/or personal cache 130. On the other hand, if the provided indication of content does not match content that has previously been cached in a public cache and/or personal cache 130, it may be desirable to receive additional content since it may be likely that such additional content would also not be cached in in the public cache and/or personal cache 130. In some implementations in which additional content is not received based on determining the indication of content matches content that has previously been cached in a public cache and/or personal cache, the content processing system 150 may associate the document identifier with a timestamp, and a link to the previously cached version of the content. For example, if it is determined, based on indicated content of a webpage being viewed by a user, that the webpage is the same as a previously cached version of the webpage, an entry may be created that associates the document identifier of the webpage with the time and/or date at which the user viewed the webpage and with the previously cached version of the webpage.

In some implementations determining whether the content should be provided by the computing device 110 may be based on determining a similarity between the subset of the content and previously stored content associated with the document identifier. The content processing system 150 may receive the subset of the content, and compare that with an existing database of previously stored content. In some implementations the previously stored content may be content stored in the content database 120 (e.g., a public cache and/or public index) and/or content stored in the personal cache 130 and/or personal index 140. In some implementations a similarity may be determined between the subset of the content and previously stored content associated with the document identifier. In some implementations the additional content may not be provided by the computing device to the content processing system 150 if a similarity threshold is satisfied. For example, one or more measures of similarity and/or dissimilarity may be utilized to determine if a similarity threshold between the subset of the content and previously stored content associated with the document identifier is satisfied.

For example, the user may have visited a news webpage at a first time, and may be revisiting the webpage for an update at a second time. The web browser 115 may forward the document identifier of the webpage visited by the user and a subset of its content at the second time to the content processing system 150. The content processing system 150 may identify the previously stored content associated with the document identifier in the personal cache 130 of the user. The previously stored content may include, for example, the entirety of the previous version of the news webpage as it was received by the web browser 115 at the first time. The content processing system 150 may determine a similarity between the subset of the content and the previously stored content. For example, if new news headlines are present on the news webpage, then the similarity score may be less indicative of similarity (e.g., a similarity threshold may not be satisfied), and the content processing system 150 may prompt the web browser 115 to provide additional content of the webpage (e.g., the entirety of the webpage) to the content processing system 150. On the other hand, if no new news stories are present, then the similarity score may be more indicative of similarity (e.g., a similarity threshold may be satisfied), and the content processing system 150 may not prompt the web browser 115 to provide additional content of the webpage to the content processing system 150.

The techniques for determining similarity may vary from implementation to implementation. For example: a Levenshtein edit distance between the subset of the content and previously stored content associated with the document identifier may be utilized; a Jaro-Winkler edit distance between the subset of the content and previously stored content associated with the document identifier may be utilized; a Jaccard index may be utilized; a Masi distance may be utilized; and/or character counts between the subset of the content and previously stored content associated with the document identifier may be utilized. In some implementations cosine similarity may be determined between the subset of the content and previously stored content associated with the document identifier. Other techniques for determining similarity may be utilized. For example, similarity determination techniques utilized in web crawling technology may be utilized to determine the similarity between the subset of the content and previously stored content associated with the document identifier.

In some implementations the subset of the content of a web-based document may include metadata such as metadata including an indication of the most recent update date and/or time of the web-based document. The content processing system 150 may determine whether the content should be provided by the computing device 110 based on the most recent update date and/or time. For example, the content processing system 150 may match the most recent update date and/or time against timestamp data and/or other content associated with a previously cached version of the web-based document in the personal cache 130 of the user. If the most recent update date and/or time precedes the timestamp data, the content processing system 150 may determine that the content should not be provided by the computing device 110. In some implementations in which additional content is not received based on determining the indication of content matches content that has previously been cached in a public cache and/or personal cache, the content processing system 150 may associate, in the personal cache 130, the document identifier with a timestamp, and a link to the previously cached version of the content.

In some implementations the entirety of the content received by the content processing system 150 from the computing device 110 for a given web-based document may be stored in the personal cache 130. In some implementations only a subset of the content received by the content processing system 150 from the computing device 110 for a given web-based document may be stored. For example, content identified as advertisements may be excluded. Also, for example, content that is determined to be beyond a threshold size, such as a large video, may be excluded and/or less of the content may be stored. For example, for a large video only a segment of the video may be stored and/or only metadata of the video may be stored.

Also, for example, in some implementations the content processing system 150 may determine that certain provided content of a web-based document may already be stored in a public cache and/or in the personal cache 130. Accordingly, the content processing system 150 may determine not to store such content in the personal cache 130 of the user and/or to store a link to corresponding previously stored content in the public cache and/or in the personal cache. Likewise, in some implementations the content processing system 150 may determine that certain provided content of a web-based document is not already stored in a public cache and/or in the personal cache 130. Accordingly, the content processing system 150 may determine to store such content in the personal cache 130 of the user.

As an example, a user may visit a webpage having content A, B, C at a first time. The computing device 110 of the user may provide the document identifier of the webpage and the content A, B, C to content processing system 150. Content processing system 150 may associate the document identifier with the content A, B, C and with the first time. The content processing system 150 may further store the document identifier, the content A, B, C, the first time, and their association in personal cache 130. The user may then visit the same webpage at a second time when the webpage has content A, B, D. The computing device 110 of the user may provide the document identifier of the webpage and the content A, B, D to content processing system 150. Content processing system 150 may associate the document identifier with the content A, B, D and with the second time in personal cache 130. The content processing system 150 may determine that content A and B are already associated with the document identifier at a different time. Accordingly, the content processing system 150 may only store the content D and store an association between the document identifier and content A, B, D, and the second time in the personal cache 130. In some implementations the association between the document identifier and the content A and B may be in the form of pointers and/or other references to the previously stored content A and B.

As described herein, in some implementations the content processing system 150 may also receive navigation information via the computing device 110 and/or other computing device in combination with a document identifier and/or content of a web-based document. The navigation information is indicative of one or more user actions via the computing device 110 and/or other computing device in navigating to the web-based document. The navigation information may include, for example, one or more aspects of the navigation information described herein. The navigation information may likewise be stored, and associated with the document identifier and/or content of the web-based document in the personal cache 130.

In some implementations the content processing system 150 may utilize navigation information to determine what content to store in the personal cache 130 of the user and/or indexed in the private index 140 of the user. For example, if the navigation information for a web-based document includes a search query that led the user to the web-based document, the terms of the search query may be utilized to determine which content of the web-based document is pertinent and/or most pertinent to the search query and only such pertinent content may be stored in the personal cache 130.

In this specification, the term "database" and "cache" will be used broadly to refer to any collection of data. The data of the database and/or the cache does not need to be structured in any particular way, or structured at all, and it can be stored on storage devices in one or more geographic locations. Thus, for example, the content database 120, the personal cache 130, and/or the personal index 140 may each include multiple collections of data, each of which may be organized and accessed differently.

In some implementations the content processing system 150 may remove certain entries from the personal cache 130 and/or personal index 140 if timestamp information related to the entries exceeds a time threshold. For example, entries may be removed from the personal cache 130 after one year of storage. In some implementations the user may request that certain and/or all entries of the personal cache 130 and/or personal index 140 be removed. For example, the user may review entries of the personal cache 130 and/or personal index 140 and certain and/or all of the entries may be deleted automatically in response to a request from the user (e.g., a selection of a "delete" option associated with an entry and/or entries). Additional and/or alternative restrictions may optionally apply to entries in the personal cache 130 and/or personal index 140.

In some implementations the content processing system 150 may selectively provide a personal cached version of a web-based document to a user via computing device 110 and/or other computing device. For example, it may be desirable to provide the user with a personal cached version of a web-based document when, for example: the web-based document is currently unavailable, a current version of the web-based document accessed by the user is significantly different than the personal cached version, and/or user actions may indicate the personal cached version is more relevant to the user than the current version. For example, a referrer URL to a webpage may indicate that the user arrived at the webpage after searching for a certain term and it may be determined that a personal cached version of the webpage has more relevance to that certain term than the current version of the webpage. Based on such a determination, the cached version of the webpage may be provided to the user (e.g., automatically and/or after user approval).

Also, for example, a user may revisit a webpage that is updated frequently to view a link that was provided on the webpage the last time the user visited, but that is no longer present. In such a situation the user may desire to see a personal cached version of the webpage. In some implementations an option to view such a cached version may be selected by the user on the user's own volition (e.g., after recalling the link was on a previous version of the webpage). In some implementations the content processing system 150 may provide the user with the option to view a cached version of the webpage or automatically provide a cached version of the webpage after comparing the current version of the webpage to one or more cached versions of the webpage. In some implementations the computing device 110 may provide a document identifier and/or content of the webpage, and/or navigation information related to the current webpage to the content processing system 150 to enable the content processing system 150 to determine whether to provide a personal cached version of the webpage. For example, the web browser 115 may provide such items to the content processing system 150 as described herein.

As an example, for a webpage identified by a user action (e.g., visited by a user and/or linked to a search result provided to a user), a document identifier (e.g., URL), current content associated with the webpage, and optionally navigation information related to the current webpage (e.g., a referrer URL) may be provided. The content may be provided by the computing device 110 of the user and/or other computing device (e.g., search engine). The content processing system 150 may: receive the document identifier; receive the current content; determine previously stored personal cached content associated with the document identifier and with the user; compare the current content to the previously stored personal cached content; and determine whether to provide the previously stored personal cached content based on the comparison. In some implementations the current content may include content of the current webpage. The current content may be compared to the previously stored personal cached content to determine if the previously stored personal cached version is different enough that the user may want to be provided with the option to view such version.

As described, in some implementations navigation information of the current version and/or personal cached version of a webpage may be utilized to determine which of the current version of the webpage and the personal cached version of the webpage is more relevant to the user. For example, a personal cached version of a sports webpage for a Chicago news source may include a document identifier for the webpage, content of the webpage as it was previously viewed by the user, and navigation information related to how the user previously navigated to the webpage. For example, the navigation information may indicate that the user submitted a search query of "blackhawks hockey news" and selected a search result that lead to the sports webpage of the Chicago news source. The user may subsequently issue a query of "blackhawks hockey". In some implementations the personal cached version may be determined to be more relevant to the user based on similarity between the subsequently issued query and the content and/or navigation information associated with the personal cached version. For example, the personal cached version of the webpage may have been during hockey season and the subsequently issued query may be issued four months past hockey season. Accordingly, the current sports webpage of the Chicago news source may no longer include the same breadth of content related to hockey as is included in the personal cached version. The search result may include an option to view the personal cached version and/or upon selecting the search result the user may be provided the option to view the personal cached version.

Also, for example, the user may navigate to a webpage of an online shopping store that includes product and/or pricing information related to Product A. The content processing system 150 may store the document identifier and contents of the webpage in an entry of the personal cache 130 for the user. At a future time, the user may issue a search query for "Product A" and navigate to the webpage for the online shopping store. However, Product A may no longer be on the webpage. Based at least on such navigation information, the content processing system 150 may determine that the previously cached version of the webpage may be more relevant to the user than the current version of the webpage.

In some implementations whether a previously cached version of a web-based document is provided to a user may be based on the frequency with which the user may visit the web-based document and/or a website hosting the web-based document. For example, if the user visits a news website very frequently, the user navigating to a webpage of the news website may simply be to see the current news and it may be determined the user does not have a desire to see old news present in a previously cached version of the news webpage. However, if the user has only visited the news website once a few months ago, the user navigating to a webpage of the news website may be indicative of the user attempting to locate the previously viewed webpage and it may be determined the user does desire to see the personal cached version of the previously viewed webpage In some implementations previously cached versions of web-based documents may be provided in response to a query issued by the user. For example, the personal cache 130 and/or the personal index 140 may be searched in response to a query issued by the user. One or more search results for personal cached documents that are responsive to the query may be presented to the user. In some implementations the personal search results may be presented with an indication that they are personal search results and/or represent a previously viewed version of the web-based document to which they refer.

In situations in which the systems described herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

The content database 120, the personal cache 130, the personal index 140, and/or the content processing system 150 may be implemented in hardware, firmware, and/or software running on hardware. For example, one or more of the systems may be implemented in one or more computer servers. Many other configurations are possible having more or fewer components than the environment shown in FIG. 1. For example, the personal cache 130 and the personal index 140 may be combined.

Figure 2:
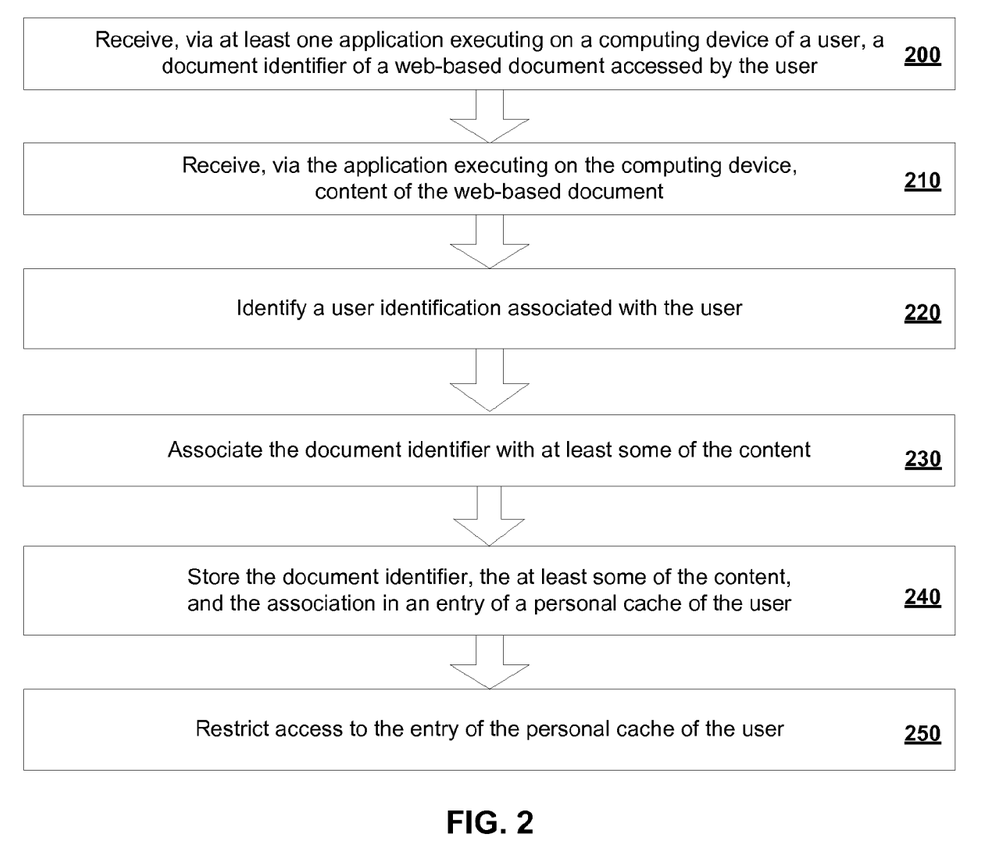
FIG. 2 is a flow chart illustrating an example method of creating an entry in a personal cache of a user.

Referring to FIG. 2, a flow chart illustrates an example method of creating an entry in a personal cache of a user. Other implementations may perform the steps in a different order, omit certain steps, and/or perform different and/or additional steps than those illustrated in FIG. 2. For convenience, aspects of FIG. 2 will be described with reference to a system of one or more components that perform the process. The system may include, for example, the content processing system 150 of FIG. 1.

At step 200, a document identifier of a web-based document accessed by the user may be received via at least one application executing on a computing device of a user. For example, the content processing system 150 may receive the URL "exampleurl.com/news1.html" of a news article accessed by a user. The URL may be provided, for example, via the web browser 115 of computing device 110.

At step 210, content of the web-based document may be received via the at least one application executing on the computing device of a user. For example, the content processing system 150 may receive the content of the news article accessible at "http://exampleurl.com/news1.html". In some implementations the content may include the entirety of the content. In some implementations the content may include enough content to reproduce the entirety of the web-based document and/or to reproduce at least a portion of the web-based document.

As described herein, in some implementations an indication of the content may be received prior to receiving the content at step 210. Based on the indication of the content, the content processing system 150 may determine whether to instruct the computing device to provide the content. For example, if the indication of the content indicates desirable content for storing in the personal cache 130, the content processing system 150 may provide approval instructions to the application executing on the computing device of the user to provide the content. Also, as described herein, in some implementations navigation information indicative of one or more user actions via the computing device in navigating to the web-based document may also optionally be received at step 210.

At step 220, a user identification associated with the user may be identified. For example, the user identification may be provided by the computing device of the user. For example, the user identification may be provided with the document identifier received at step 200 and/or the content received at step 210. The user identification specifies the identity of a user of the computing device and may be utilized to determine access information applied to information provided by the computing device when the content processing system 150 provides such information for storage in the personal cache 130 and/or the personal index 140. For example, the user identification may be associated with a user's account to a given service and may be utilized to indicate that information stored in the personal cache 130 and/or the personal index 140 may only be accessed by the user when the user is logged in to the account with the given service.

At step 230, the document identifier may be associated with at least some of the content. For example, content processing system 150 may associate the entirety of the content received at step 210 with the document identifier received at step 200. In some implementations only a subset of the content is associated with the document identifier. For example, advertisement related content received at step 210 may be excluded. In some implementations where navigation information is received, the navigation information may also be associated with the document identifier and the at least some of the content. Also, in some implementations where timestamp information indicating a date and/or time that the referenced web-based document was viewed by a user is received and/or determined, such timestamp information may be included with the document identifier and/or may be associated with the document identifier and the at least some of the content.

At step 240, the document identifier, the at least some of the content, and the association between the at least some of the content and the document identifier may be stored in an entry of the personal cache of the user. For example, the content processing system 150 may store the URL, the content of the news article, and the association between the URL and the content of the news article in an entry of the personal cache 130 of the user. In some implementations where navigation information is received, the navigation information may also be stored in the entry and the association between the navigation information and the at least some of the content and the document identifier also stored in the entry. Also, in some implementations where timestamp information indicating a date and/or time that the referenced web-based document was viewed by a user is received and/or determined, such timestamp information may also be stored in the entry and the association with the document identifier and the at least some of the content stored in the entry.

At step 250, access to the stored information in the entry of the personal cache of the user is restricted. For example, the content processing system 150 may include access information with an entry and/or grouping of entries in the personal cache 130 that specifies that only the user identified by the user identification received at step 220 is authorized to access the entry. For example, the access information may be associated with one or more accounts of the user to one or more services and may only allow the user to access the entry when the user is logged into such one or more accounts. The user identification may also be utilized to determine which entries in personal cache 130 and/or personal index 140 a user is allowed to access. For example, only those entries in the personal cache 130 and/or personal index 140 that are associated with access information that is determined to match the user identification may be accessed.

Figure 3:
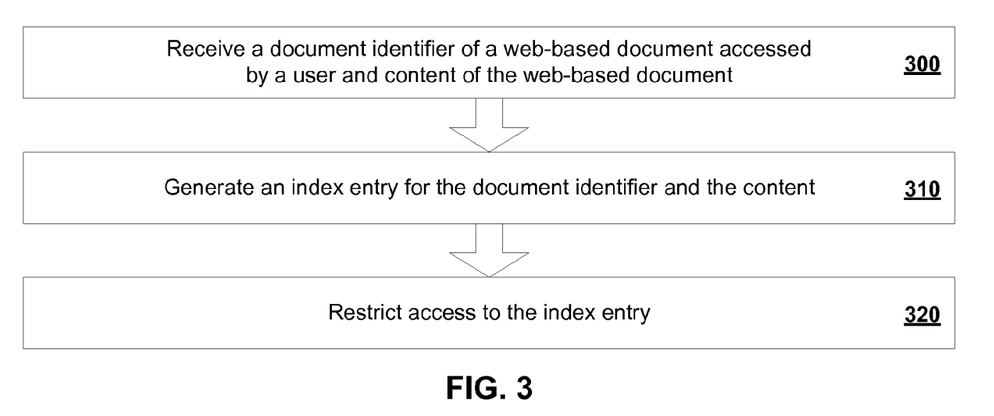
FIG. 3 is a flow chart illustrating an example method of creating an entry in a personal index of a user.

Referring to FIG. 3, a flow chart illustrates an example method of creating an entry in a personal index of a user. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the content processing system 150 of FIG. 1.

At step 300, a document identifier of a web-based document accessed by a user and content of the web-based document is received. In some implementations the document identifier and the content of the web-based document may be received via the personal cache 130. For example, an entry created utilizing the method of FIG. 2 may be received. As an example, an entry including associated timestamp information, a document identifier of a webpage, content of the webpage, and navigation history related to the user's visit to the webpage may be received.

At step 305, an index entry for the document identifier and the content is generated. Continuing the example of step 300, the index item may include an indicator of the document identifier, an indicator of the timestamp information, an indicator of the navigation history, and one or more aspects of the content. The one or more aspects of the content may be determined, for example, based on prominence of the content in the webpage, the navigation history, and/or other factors. For example, certain terms of the webpage may be selected for inclusion in the index entry based on prominence of those terms. For example, prominence of the terms may be based on term frequency inverse document frequency (TFIDF) of the terms, placement of the terms in the webpage (e.g., title, body, early in the webpage), relation of the terms to the navigation history, and/or other factors. In some implementations each of one or more of the indexed aspects of the content may be ranked. For example, a first more prominent term of the webpage may be ranked more prominently than a second less prominent of the webpage.

At step 310 access to the index entry is restricted. For example, access may be allowed only for the user associated with the information received at step 300. For example, the content processing system 150 may include access information with an entry of the personal index 140 that specifies that only the user identified by the user identification associated with the information received at step 300 may be provided access to the entry. Also, for example, the access information may be associated with one or more accounts of the user to one or more services and may only allow the user to access the entry when the user is logged into such one or more accounts.

Figure 4:
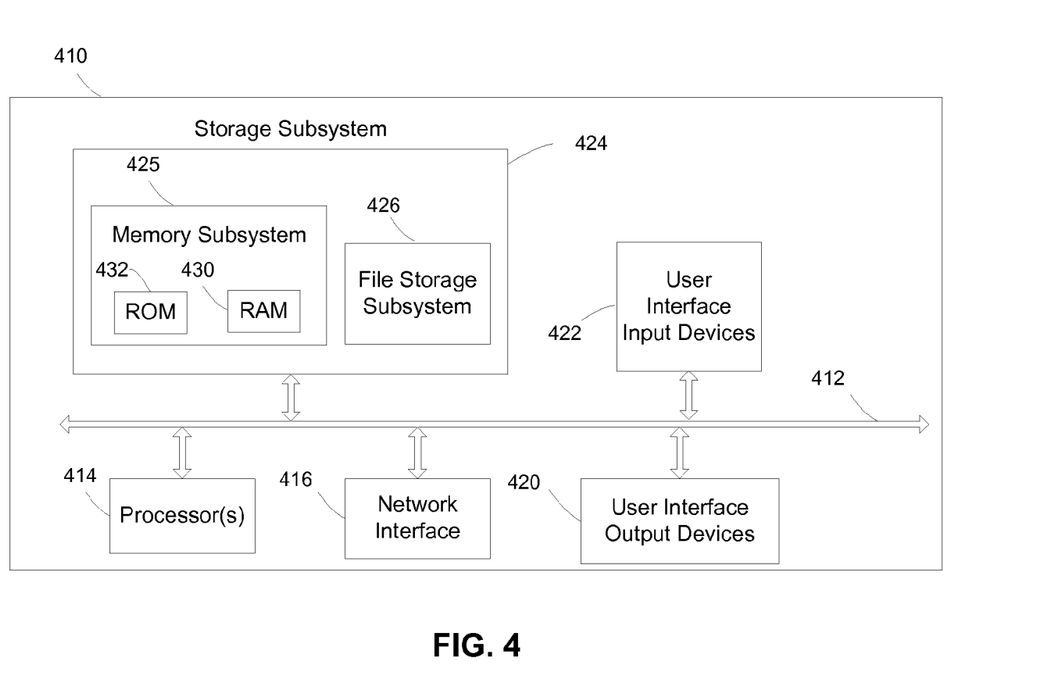
FIG. 4 illustrates a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface input devices 422, user interface output devices 420, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to implement one or more techniques described herein with respect to content processing system 150. As another example, the storage subsystem 424 may include the logic to receive content from a computing device of a user and store the content in a personal cache of the user.

These software modules are generally executed by processor 414 alone or in combination with other processors. Memory 425 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
  receiving, by a system of one or more servers and via one or more network interfaces:
    a document identifier of an electronic document that is a dynamic document accessed by a user via an application of a computing device of the user, and
    specific content, of the electronic document, that is dynamic content that is tailored to the user at a particular time the electronic document is accessed by the user and that is rendered at the time the electronic document is accessed by the user,
      wherein the specific content excludes any advertisements and the specific content is tailored to the user based on interests of the user, and the document identifier and the specific content being provided to the system by the computing device based on an access of the electronic document via the computing device;

determining, by the system, timestamp information that defines one or both of: a date of the access of the electronic document by the user, and a time of the access of the electronic document by the user, wherein determining the timestamp information is based on a date and/or time of receiving the document identifier, or is based on information received from the computing device with the document identifier;

identifying, by the system, an account the user is logged into at the time of the access of the electronic document by the user;

storing, by the system, and in response to receiving the document identifier and the specific content from the computing device, an entry in a personal cache for the user, wherein storing the entry comprises storing, in the entry, an association between the document identifier, the specific content, and the timestamp information;

restricting, by the system, access to the personal cache of the user based on the account, wherein restricting access to the personal cache based on the account comprises enabling access to the personal cache by the user while preventing access to the entry by any other users;

subsequent to storing the entry:

receiving a search query submitted by the user when the user is logged into the account;

based on the search query being submitted by the user when logged into the account, accessing the personal cache and determining that the entry, of the personal cache, is responsive to the search query;

in response to determining that the entry is responsive to the search query:

causing, in response to the search query, content from the entry to be presented along with an indication that the content is personal to the user and is based on previous access of the electronic document by the user, the content including the specific content from the entry.

2. The method of claim 1, further comprising:

receiving, from the computing device and by the system via one or more of the network interfaces, navigation information indicative of one or more actions, of the user, via the computing device in navigating to the electronic document, wherein the navigation information is based on content of a prior electronic document via which the user navigated to the electronic document;

wherein storing the entry further comprises storing, in the entry, an association of the navigation information to the document identifier.

3. The method of claim 2, wherein the navigation information further includes a particular search query issued that resulted in the access of the electronic document by the user, and wherein determining that the entry is responsive to the search query is based on similarity between the search query and the particular search query stored in the entry.

4. The method of claim 3, wherein the particular search query includes one or more terms that are not included in the search query.

5. The method of claim 1, wherein the electronic document is not accessible via public crawling.

6. The method of claim 1, wherein the document identifier is a uniform resource identifier.

7. A system comprising:

one or more network interfaces;

memory; and one or more processors operable executing instructions, stored in the memory, to cause the one or more processors to:

receive, via one or more of the network interfaces:

a document identifier of an electronic document that is a dynamic document accessed by a user via an application of a computing device of the user, and specific content, of the electronic document, that is dynamic content that is tailored to the user at a particular time the electronic document is accessed by the user and that is rendered at the time the electronic document is accessed by the user, the specific content (a) being received by the system from the computing device based on access of the document by the computing device, (b) being tailored to social networking connections and preferences of the user, and (c) excluding any advertisements, and the document identifier and the specific content being provided to the system by the computing device based on an access of the electronic document via the computing device;

determine timestamp information that defines one or both of: a date of the access of the electronic document by the user, and a time of the access of the electronic document by the user;

identify an account the user is logged into at the time of the access of the electronic document by the user;

store an entry in a personal cache for the user, wherein in storing the entry one or more of the processors are to store, in the entry, an association between the document identifier, the specific content, and the timestamp information;

restrict access to the personal cache of the user based on the account, wherein in restricting access to the personal cache based on the account one or more of the processors are to enable access to the personal cache by the user while preventing access to the entry by any other users;

subsequent to storing the entry:

receive a search query submitted by the user when the user is logged into the account;

based on the search query being submitted by the user when logged into the account, access the personal cache and determine that the entry, of the personal cache, is responsive to the search query;

in response to determining that the entry is responsive to the search query:

cause, in response to the search query, content from the entry to be presented along with an indication that the content is personal to the user and is based on previous access of the electronic document by the user, the content including the specific content from the entry.

8. The system of claim 7, wherein in executing the instructions one or more of the processors are further to:

receive, from the computing device via one or more of the network interfaces, navigation information indicative of multiple actions, of the user, via the computing device in navigating to the electronic document;

wherein in storing the entry one or more of the processors are further to store, in the entry, an association of the navigation information to the document identifier.

9. The system of claim 8, wherein the navigation information includes a particular search query issued that resulted in the access of the electronic document by the user, and wherein in determining that the entry is responsive to the search query one or more of the processors are to determine that the entry is responsive to the search query based on similarity between the search query and the particular search query stored in the entry.

10. The system of claim 9, wherein the particular search query includes one or more terms that are not included in the search query.

11. The system of claim 7, wherein the electronic document is not accessible via public crawling.

12. The system of claim 7, wherein the document identifier is a uniform resource identifier.

13. At least one non-transitory computer readable medium storing instructions that, when executed by one or more processors, cause the one or more processors to:
receive, via one or more of the network interfaces:
a document identifier of an electronic document that is a dynamic document accessed by a user via an application of a computing device of the user, and
specific content, of the electronic document, that is dynamic content that is tailored to the user at a particular time the electronic document is accessed by the user and that is rendered at the time the electronic document is accessed by the user,
wherein the specific content excludes any advertisements and the specific content is tailored to the user based on categorical interests of the user, and
the document identifier and the specific content, being provided via the one or more network interface by the computing device based on an access of the electronic document via the computing device;
determine timestamp information that defines one or both of: a date of the access of the electronic document by the user, and a time of the access of the electronic document by the user;
identify an account the user is logged into at the time of the access of the electronic document by the user;
store an entry in a personal cache for the user in response to receiving the document identifier and the specific content, wherein in storing the entry one or more of the processors are to store, in the entry, an association between the document identifier, the specific content, and the timestamp information,
wherein the personal cache includes an additional entry, the additional entry being previously stored responsive to a prior access of the electronic document by the computing device and the additional entry including an association between the document identifier, alternative specific content, and prior timestamp information associated with the prior access;
restrict access to the personal cache of the user based on the account, wherein in restricting access to the personal cache based on the account one or more of the processors are to enable access to the personal cache by the user while preventing access to the entry by any other users;
subsequent to storing the entry:
receive a search query submitted by the user when the user is logged into the account;
based on the search query being submitted by the user when logged into the account, access the personal cache and determine that the entry, of the personal cache, is responsive to the search query;
in response to determining that the entry is responsive to the search query:
cause, in response to the search query, content from the entry to be presented along with an indication that the content is personal to the user and is based on previous access of the electronic document by the user, the content including the specific content from the entry.

14. The non-transitory computer readable medium of claim 13, wherein the instructions, when executed, further cause one or more of the processors to:
receive, from the computing device via one or more of the network interfaces, navigation information indicative of multiple actions, of the user, via the computing device in navigating to the electronic document;
wherein in storing the entry one or more of the processors are further to store, in the entry, an association of the navigation information to the document identifier.

15. The non-transitory computer readable medium of claim 14, wherein the navigation information includes a particular search query issued that resulted in the access of the electronic document by the user, and wherein in determining that the entry is responsive to the search query one or more of the processors are to determine that the entry is responsive to the search query based on similarity between the search query and the particular search query stored in the entry.

16. The non-transitory computer readable medium of claim 15, wherein the particular search query includes one or more terms that are not included in the search query.

17. The non-transitory computer readable medium of claim 13, wherein the electronic document is not accessible via public crawling.

18. The non-transitory computer readable medium of claim 13, wherein the document identifier is a uniform resource identifier.

* * * * *